United States Patent [19]
O'Farrell et al.

[11] Patent Number: 5,655,101
[45] Date of Patent: Aug. 5, 1997

[54] ACCESSING REMOTE DATA OBJECTS IN A DISTRIBUTED MEMORY ENVIRONMENT USING PARALLEL ADDRESS LOCATIONS AT EACH LOCAL MEMORY TO REFERENCE A SAME DATA OBJECT

[75] Inventors: William G. O'Farrell, Don Mills; Eshrat Arjomandi, Etobicoke, both of Canada

[73] Assignee: International Business Machines Corporation, Armonk, N.Y.

[21] Appl. No.: 250,202

[22] Filed: May 27, 1994

[30] Foreign Application Priority Data

Jun. 1, 1993 [CA] Canada .................................. 2097540

[51] Int. Cl.$^6$ ................................................ G06F 13/14
[52] U.S. Cl. .............. 395/475; 395/497.01; 395/200.47; 395/200.75
[58] Field of Search ...................... 395/474, 475, 395/497.01, 412, 200.01, 200.03, 200.09, 200.16

[56] References Cited

U.S. PATENT DOCUMENTS

| | | | |
|---|---|---|---|
| 4,635,189 | 1/1987 | Kendall | 395/600 |
| 5,075,842 | 12/1991 | Lai | 395/479 |
| 5,075,845 | 12/1991 | Lai et al. | 395/479 |
| 5,075,848 | 12/1991 | Lai et al. | 395/479 |
| 5,117,350 | 5/1992 | Parrish et al. | 395/401 |
| 5,307,490 | 4/1994 | Davidson et al. | 395/650 |
| 5,327,562 | 7/1994 | Adcock | 395/700 |
| 5,410,688 | 4/1995 | Williams et al. | 395/600 |

FOREIGN PATENT DOCUMENTS

93/00633 7/1993 WIPO .................................. 11/34

OTHER PUBLICATIONS

A. Chatterjee ES-Kit: an object-oriented distributed system 1991 vol. 3(6) pp. 525-539.
M. Shapiro Structure and Encapsulation in Distributed Systems 1986 pp. 198-204.
B. J. Nelson The Proxy Principle Remote Procedure Call 1981.
J. S. Chase The Amber System 1989 pp. 147-158.

Primary Examiner—Eddie P. Chan
Assistant Examiner—Kevin L. Ellis
Attorney, Agent, or Firm—Marilyn Smith Dawkins

[57] ABSTRACT

A mechanism and method for accessing remote data objects in a distributed memory environment is disclosed. In the distributed memory environment, a number of parallel processors are remote from each other and each has memory storage capacity with parallel address locations. For each data object stored in the local memory of a processor, that processor stores a variable at a specific location pointing to the address of the data object in its local memory. At the same (parallel) location in the local memories of all remote parallel processors, a variable pointing to the home processor for the data object is stored. In order to access the data object, it is only necessary to locate the identifier variable in the processor processing a program pointing to the processor having the data object in storage. Because of the parallel address space, the location will automatically point directly to the same address location in the home storage processor, and this address location contains the address pointing to the actual location of the data object in the local storage of that processor. Alternate means for updating the variable information on data object storage is also provided. In one system, changes are broadcast throughout the parallel processor environment while in the other system, changes are merely retained on the home processor or the home processor and one remote parallel processor responsible for recording changes in that region of the distributed memory environment. When accessed by another remote parallel processor, the change information will be transmitted.

19 Claims, 5 Drawing Sheets

ACCESSING REMOTE DATA OBJECTS IN A DISTRIBUTED MEMORY ENVIRONMENT USING PARALLEL ADDRESS LOCATIONS AT EACH LOCAL MEMORY TO REFERENCE A SAME DATA OBJECT

CROSS REFERENCE TO RELATED APPLICATIONS

Application Ser. No. 08/239,192, Filed May 6, 1993, now abandoned in favor of application Ser. No. 08/674,266, and filed by William G. O'Farrell, "Controlling Method Invocation Sequence Through Virtual Functions In An Object-Oriented Class Library", and assigned to International Business Machine Corporation which is hereby incorporated by reference.

BACKGROUND OF THE INVENTION

1. Field of the Invention

The present invention relates to the field of distributed memory environments in object-oriented technology, and is directed to providing transparent access to data objects located in the memory address spaces of remote processors.

2. Description of the Related Art

The term "object" used herein refers to a package of data that is a representation of related information maintained in contiguous memory locations. In object-oriented technology, an object is a member of a class and has a defined set of operations that are permitted to be performed on the object and other objects that are members of the same class.

Distributed memory models are important in object-oriented languages such as C++ because they give the illusion of concurrency in performing multiple operations simultaneously.

Languages that inherently accommodate concurrency can be utilized in a shared memory environment where independent threads of control can be spun from the same memory environment.

For example, U.S. Pat. No. 5,075,842—Lai, and U.S. Pat. Nos. 5,075,845 and 5,075,848, both to Lai et al., are all addressed to a single address space in a paged memory, shared by a plurality of processors. An object table object located in the address space is accessible to processors on processor initialization and supports the processor in determining the addresses of data objects stored in the paged memory. These patents use the concept of "access descriptors" or protected pointers located in the address space as a security measure to limit access/modification to certain types of data objects in the absence of a properly implemented processor access mode.

By contrast to the shared memory model discussed above, in a distributed memory model, processors have exclusive access to their own local memories. Processors communicate by explicit messages, carried by communication subsystem. In most distributed memory machines, the message passing subsystem hides the actual underlying topology from the user, and allows messages to be addressed to arbitrary processors in the distributed memory environment.

The present invention is directed to homogeneous distributed memory parallel computers or computer clusters. These types of systems do not raise specific issues such as heterogeneity of data representation, fault tolerance, or name resolution that might be applicable in a larger distributed system. Nevertheless, the present invention would be adaptable to a larger distributed system with proper modification obvious to one skilled in the art.

In object-oriented languages like C++, a problem arises where one wishes to distribute objects among a group of processors having separate address spaces, and subsequently to reference objects that may be located on remote processors in the system. When an object resides in the memory of a processor, that processor may simply use the address of the object (i.e., a variable denoting that object's location in memory) to refer to it. However, simply passing that address to another processor in the system would be meaningless since the receiving processor has no way of knowing, from the bare address variable, that the address refers to a remote processors, and implicitly cannot know which other processor in the group to refer to in order to access the data object.

Instead, other processors must have some way of referring to an object that is remote, so that operations on the object may be forwarded to the processor where the object resides.

A number of solutions have been proposed to the problem of representing objects so that they may be referred to by remote processors in distributed memory environments. One proposal is the use of global identifiers, as described in A. Chatterjee, A. Khanna and Y. Hung, "ES/Kit: An Object Oriented Distributed System", Concurrency: Practice and Experience, Volume 3(6), 1991, pp. 525–539. In this reference, global identifiers used in place of object references when objects are referenced. However, these identifiers must be translated into local references each time they cross a node boundary. (It should be pointed out that the term "node" as used in this application refers to a location of local memory in a distributed memory environment. Nodes may or may not have processors separately associated with them, but for the purposes of the present application, it will be assumed that the term "node" is interchangeable with "processor" in distributed memory environment.)

Similarly, U.S. Pat. No. 5,117,350—Parrish et al., which provides for partitioning of local memory in nodes in a distributed memory system, requires translation through partition maps located at each local node memory in order to establish remote access to data objects in that local memory.

A different approach is to represent remote objects by "proxies". As described in M. Shapiro, "Structure and Encapsulation in Distributed Systems: The Proxy Principle", Proceedings of Sixth International Conference of Distributed Computer Systems, May 1986, pp. 198–204, proxies may be introduced as local representatives of remote objects. The proxies described in Shapiro are in many ways similar to the notion of a "stub" introduced as an interface between clients and services in B. J. Nelson, "Remote Procedure Call", Carnegie-Mellon University Report CMU-CS-81-119, May 1981. Proxies assist in providing local transparency in a system where objects are distributed across many nodes. They allow uniform invocation of methods, irrespective of their location. However, proxies alone are not sufficient to provide location transparency in the presence of dynamic object creation and migration.

The problem of maintaining a record of unrestricted object creation/destruction has only been addressed in the context of a single memory. For example, WO9300633—Hastings, describes a forward control index table containing a listing of offsets or code blocks for data items in memory, that may be updated if the location of data items is changed when further data has been inserted between the offsets in a data code file.

In J. S. Chase, et al., "The Amber System: Parallel Programming on a Network of Multiprocessors", Proceedings of the 12th ACM Symposium on Operating System Principles", 1989, pp. 147–158, a programming system called "Amber" is described that allows an application system to take advantage of multiprocessors. This system uses object descriptors (a similar notion to proxies), name servers and virtual space, to provide location transparency in the following way. The virtual address space on each node is identical, and is divided into regions, one region for each node in the network. All objects are allocated on all nodes, even though only one node actually holds the object. The remote nodes can use some of the otherwise unused space allocated for an object to contain object descriptors and other information. Program code and static data are replicated on all nodes at the same virtual addresses. Each node in the network also has a distinct region of the address space for allocating new objects. No node in the network would use the other nodes' region when it creates new nodes.

An Amber application is a collection of mobile objects that interact through location dependent method invocations. Object migration is entirely under the control of the programmer. Amber objects are passive (passive objects have no thread of control of their own), and their methods can be invoked locally or remotely. The active objects (objects with a thread of control) of the system are "thread" objects that are migrated to a node in the network where an object whose method has been invoked resides.

While the foregoing solution avoids address translation at processor boundaries, it raises the problem that large amounts of virtual space must be wasted through duplication of objects that reside on other nodes. Furthermore, to implement this approach, nodes are required to implement virtual memory. This cannot be accomplished consistently in distributed memory systems containing large numbers of simple processors that would not otherwise require virtual memory hardware.

SUMMARY OF THE INVENTION

It is therefore an object of the present invention to provide means for referencing objects located in the distributed memories of remote processors.

It is also an object of the present invention to provide a uniform system of object references that eliminates the need for inter-nodal translation of object references or identifiers, for virtual memory hardware, and for any a priori knowledge of remoteness.

In accordance with the foregoing objects, the present invention provides, in one aspect, a composite mechanism for accessing remote data objects in a distributed memory environment having a plurality of parallel processors remote from each other. Each processor has a local memory with parallel address locations. For each data object having a storage location in the local memory of a processor, the mechanism includes a first variable storage repository at a first address location in the local memory of the processor pointing to the object's storage location in the local memory of the processor, a second variable storage repository at a first address location in the local memory of at least one remote parallel processor pointing to the processor, and link means in all remote parallel processors for accessing the second variable storage repository.

Preferably, the repository segment consists of a first zone which is adapted to contain only first variable records, and a second zone adapted to contain only second variable records identifying a unique processor signal means of other remote processors.

Preferably, the composite mechanism includes relay means for changing variable storage repositories in response to data object migration. The relay means consists of means for creating and destroying first and second variable repositories and means for replacing first and second variable repositories.

In a further aspect, a mechanism for accessing remote data objects in a distributed memory environment having a plurality of parallel processors remote from each other is also provided. Each processor in the distributed memory environment has a local memory with parallel address locations and is adapted to be a home processor storing data objects in said local memory. For each home processor, the mechanism includes a first repository storage segment in the local memory of the home processor at an address location. The first repository storage segment is adapted to contain variables pointing to the data objects concurrently stored in the local memory of the home processor. For the home processor, the mechanism also includes a second repository storage segment in the local memory of all remote parallel processors at the same address location. The second repository storage segment is adapted to contain identifiers for the data objects concurrently stored in the local memory of said home processor. For the home processor, the mechanism also includes relay means for changing the first and second repository segments in response to a change in data object storage in said local memory of the home processor.

In addition, the present invention is directed to a method for accessing remote data objects in a distributed memory environment between remote parallel processors where each parallel processor has a local memory and is adapted to be a home processor storing at least one data object in the local memory. The method includes the computer implemented steps of storing an address variable for a data object at a location in the local memory of the home processor, storing an identifier variable for the data object at the same location in the local memory of at least one remote parallel processor, locating the identifier variable for accessing the address variable, and then locating the address variable for accessing the data object in the local memory of the home processor.

BRIEF DESCRIPTION OF THE DRAWING

Embodiments of the invention will now be described in detail in association with the accompanying drawings, in which:

FIG. 1 illustrates the identical location of repository segments in the memories of each of the parallel processors;

FIG. 2 shows the addition of variable records in the local processor memory on object creation; and FIG. 3 shows the alteration of variable records in the local memories of remote processors following object creation;

DESCRIPTION OF THE PREFERRED EMBODIMENT

The present invention is directed to a distributed memory environment containing a number of separate nodes in a cluster, each of the nodes containing local memory storage.

By way of example for the purposes of the present disclosure, the distributed memory environment may be a parallel computer (a number of parallel processors in a single "box") or a collection of workstations. Because the nodes/processors are parallel, i.e., they do not share a common memory pool, they are "remote" from each other, whether or not the parallel processors are actually physically proximate to each other. Procedure calls between these remote nodes or processors are referred to as remote procedure calls (rpc's).

Figure 1:
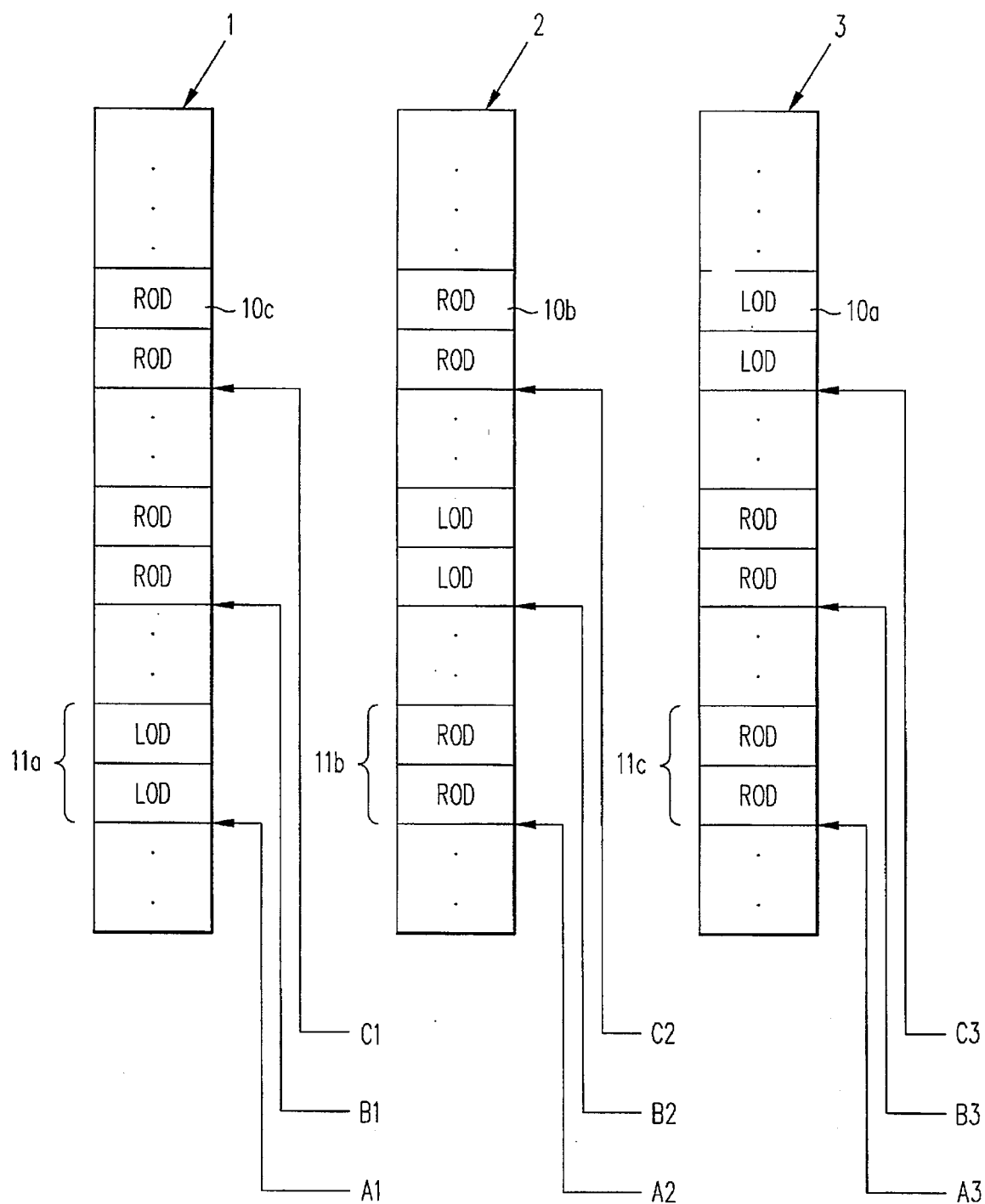
FIGS. 1 through 3 are representational views of memory segments from three parallel processors in a distributed memory environment, illustrating different states in the present invention, as follows.
Figure 2:
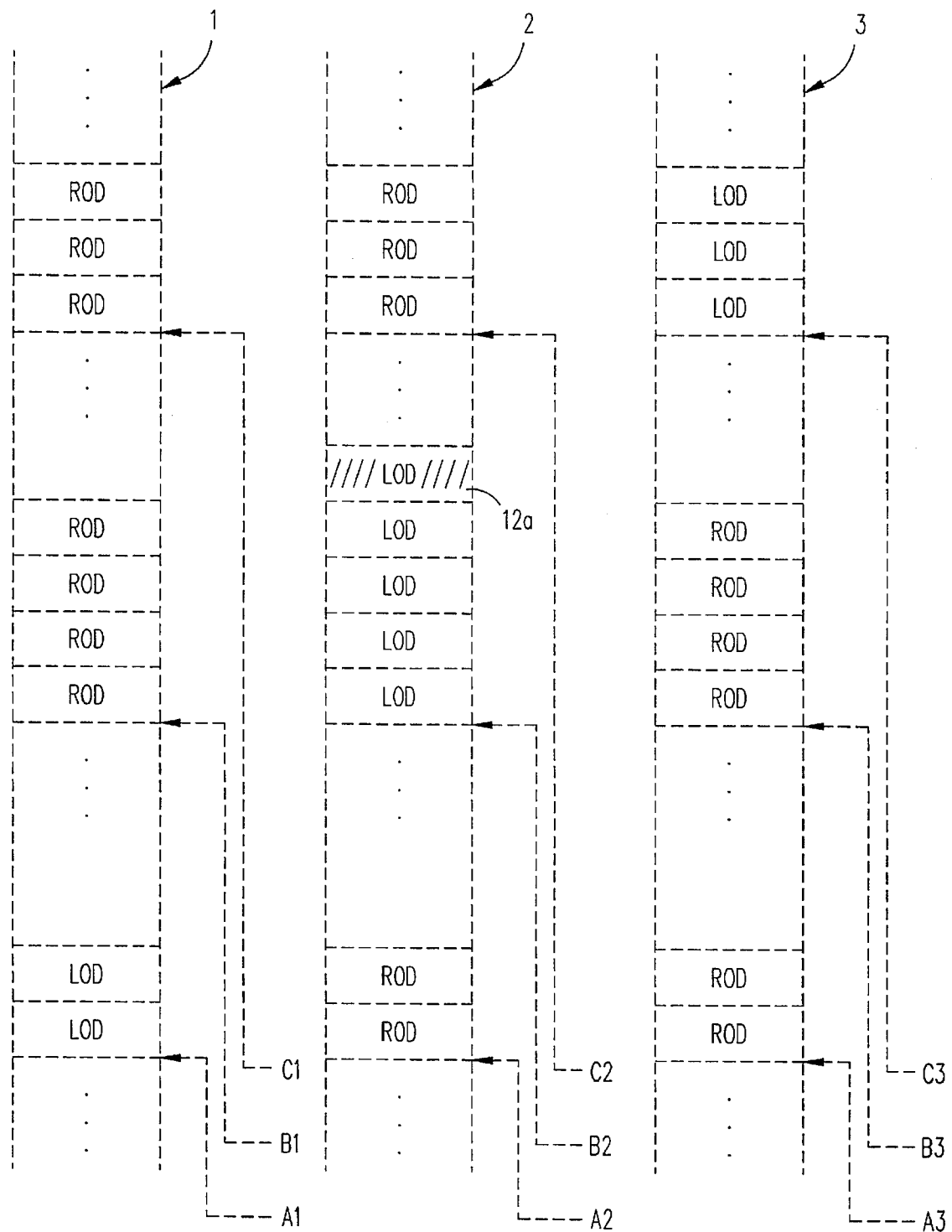
Figure 3:
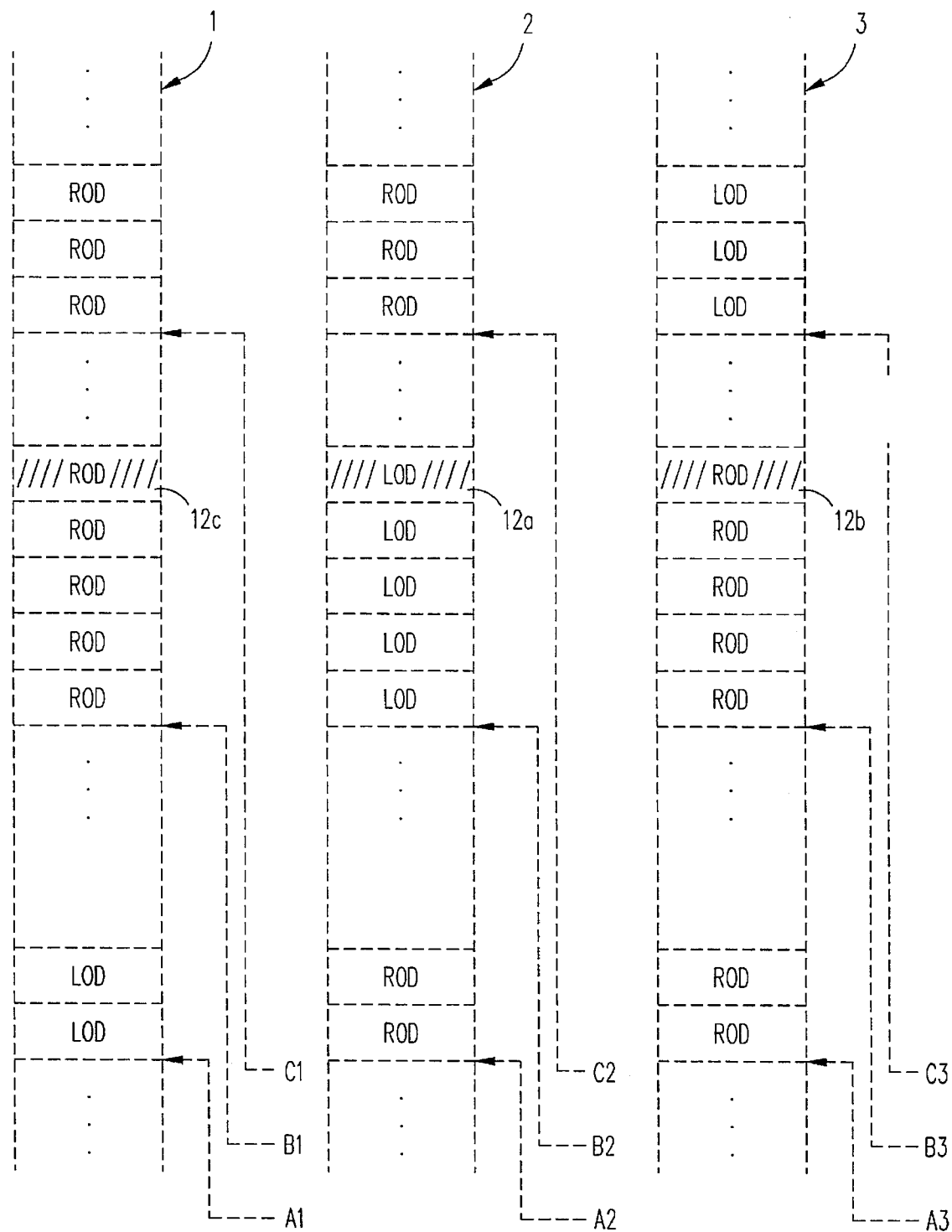

As illustrated in FIGS. 1 through 3 and described in further detail below, according to the present invention, areas of memory are allocated, in each of processors 1, 2 and 3, to contain object descriptors for locating data objects stored in the memories of all of the processors in the cluster.

In the preferred embodiment, these areas are located through the identical addresses in memory in each processor to facilitate network communication, as shown by the address locations at A (A1, A2, A3), B (B1, B2, B3) and C (C1, C2, C3) in these Figures.

Each allocated area of memory is adapted to store two types of variable records in repository segments or blocks: local object descriptors identifying the location of objects in the local memory of the particular processor, and remote object descriptors to refer to objects located in the local memories of remote processors in the distributed system.

In FIGS. 1 through 3, all repository segments containing local object descriptors are identified with the acronym LOD, while those blocks containing variable records for locating remote objects, remote object descriptors, are identified with the acronym ROD.

LODs and RODs contain the different types of variable record information. An LOD contains an address or pointer to the specific data object found in the same local memory. By contrast, an ROD contains only a standard initial value to identify the processor or node in whose memory the remote data object resides.

As is further illustrated in FIG. 1 and in the preferred embodiment of the invention, not only is the entire repository segment located at the same location in memory of each processor in the distributed system, but parallel placement of object descriptors for the same object is also effected. That is, the location of a particular local object descriptor in one processor corresponds with the location of remote object descriptors for the same object in remote processors (e.g. see 10a, 10b and 10c in FIG. 1).

Also, in the embodiment illustrated in FIG. 1, object descriptors are grouped in regions of the repository segment by processor. Thus, the two blocks (or more if required) of local object descriptors in processor 1 identified at bracket 11a, represent all of the addresses for local data objects found in local memory of processor 1. These addresses correspond with the two blocks 11b and 11c of remote object descriptors ROD found in the respective repository segments of processors 2 and 3.

FIGS. 2 and 3 show the sequential steps when a new data object is created in one of the processors in a distributed system for recording the change in the allocation areas of memory in parallel processors in the distributed memory system.

As illustrated in FIG. 2, when a new object is created in the memory of processor 2, a new local object descriptor record 12a is added to the repository segment in processor 2.

The existence of the new LOD in processor 2 is communicated to the remote processors in the system, which then allocate remote object descriptor records 12b and 12c at the same address location in their respective repository segments of memory, to facilitate quick access (FIG. 3).

To create corresponding RODs in remote processors, the present invention provides two alternate procedures.

In the first procedure, an ROD, along with descriptor address, is broadcast to all other nodes. This broadcast would signify that the processor in charge of allocating objects in the area of the descriptor address has just allocated a new object. The corresponding descriptors in all other nodes would be updated with the information in the broadcast ROD, including the identity of the originating processor. The local object descriptor in the home processor of the object would have the actual local address of the object. With reference to FIGS. 1 and 2, FIG. 2 shows that when an object is created, an LOD is created in the home processor. FIG. 3 shows that an ROD is broadcast to the other nodes. The other nodes copy the ROD into the same address location as the LOD is located on the home node.

An alternate procedure for updating RODs to correspond with a change in an LOD is a point-to-point approach. On object creation and allocation of an LOD in the local memory of the processor in which the object has been created, no action is taken to broadcast the new LOD allocation to remote processors in the system. Rather, in one aspect, one processor in the region would be in charge of allocating new objects in that region. Thus, when other processors want to invoke methods of a newly created object, on attempting to access the particular descriptor, the processor would discover that the ROD is initialized with only zeros or with other standard values. The processor would then initialize the descriptor to the processor number of the processor in charge of locating new objects in that region in order to update its own RODs.

The choice of broadcast versus point-to-point updating will largely be determined by the method of inter-nodal communication used in the implementing system, and often, in the context of the system, which approach is less expensive.

Both of the foregoing methods would also be useful in object destruction and movement of objects. A move of an object to a different local memory address would be effected simply by updating that object's LOD, without change to any corresponding RODs. For migration of an object to another node in the system described herein:

1. The RODs in all remote processors could be updated with a broadcast operation, as described as the first alternative above; or
2. The processor sponsoring the move could send a message to the processor in charge of allocating new objects in that region, informing the processor of the move. The processor in charge of allocating new objects would update the corresponding descriptor, recording the new location of the object for future reference from other remote processors. The node sponsoring the move would change its LOD for the object to an ROD, and the corresponding descriptor in the node to which the object is being moved would allocate an LOD to the object in place of an ROD. All other processors in the system containing an ROD for the object would, on failing to locate the LOD for the object in its original node, refer to the processor in charge of allocating new objects for referencing the new location of the object. According to this technique, while no broadcast is involved, remote accesses would have an extra level of indirection as the processor in charge of allocating new objects would forward a request to the node that is currently holding the object.

In an alternative embodiment, all RODs in the system would be initialized only with zeros or other standard values. In accessing an ROD for an object in its local memory, a processor would rely upon the region in its allocated area of local memory in which the ROD is located to identify the processor to which the ROD intends to refer. This was discussed in relation to FIG. 1, wherein it was noted that all of a processor's LODs would be located in contiguous blocks in the repository segment, with corresponding contiguous blocks containing RODs in parallel processors. According to this alternative, no independent record in one processor of new object allocations is required, since whenever a processor accesses an ROD, it will find the ROD initialized only with zeros or other standard values, but from the location of the ROD in the repository segment, will determine the originating processor and direct its message to it. In the case of object migration, the originating processor could then forward messages to the processor which is the current location of the object.

The system of descriptors outlined in this application is very space efficient because each descriptor is very small in size, with space for the actual object being allocated only on its "home" node or processor.

Furthermore, in a language like C++, the translation of method invocation to a remote procedure call could be made automatically, utilising an interface mechanism for redirecting thread of control that is described in detail in copending U.S. application entitled "Controlling Method Invocation Sequence through Virtual Functions in an Object-Oriented Class Library" (application Ser. No. 08/239,192), filed May 6, 1994, the contents of which are incorporated herein by reference, and illustrated in FIGS. 4 and 5 herein.

Figure 4:
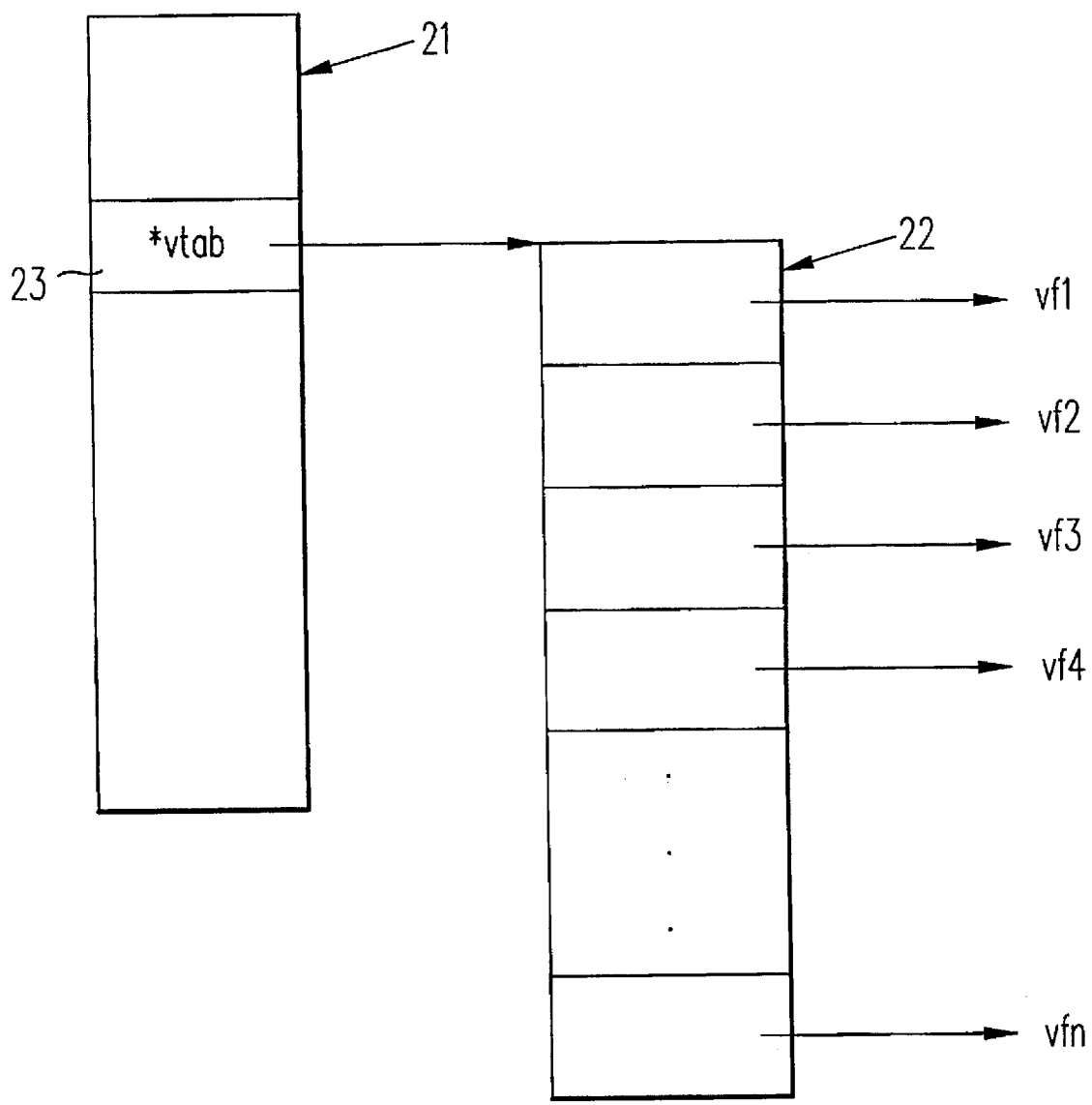
FIG. 4 is a schematic representation of an index linkage between a heap allocation of an object in an object-oriented programming language such as C++ having virtual functions and a corresponding virtual function table for a class hierarchy.
Figure 5:
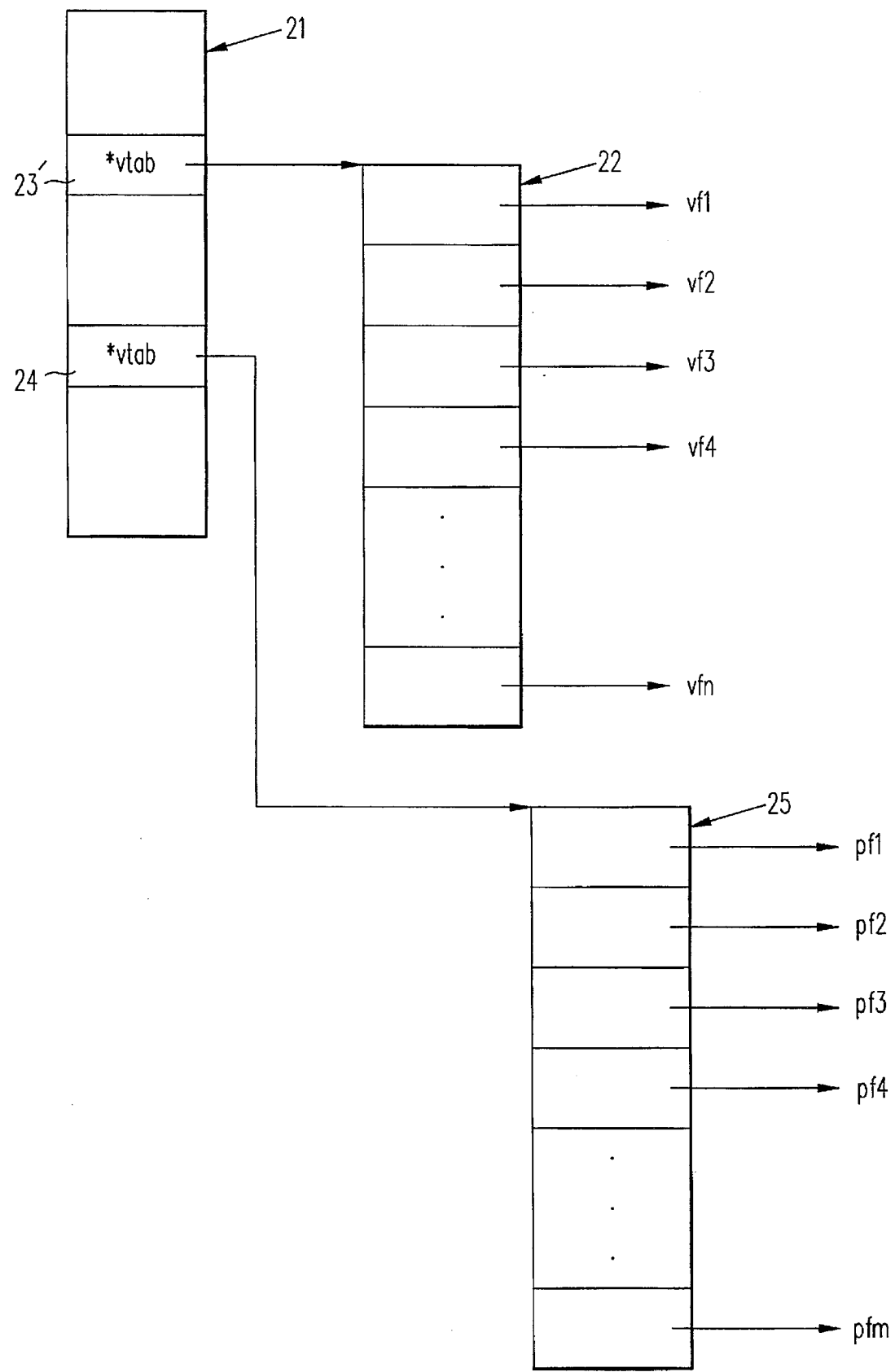
FIG. 5 is a schematic representation, similar to FIG. 4, of index linkage following substitution of a protocol function table interface between the object and the virtual function table, according to an extended embodiment of the invention.

As shown in FIG. 4, in a compiled object-oriented language such as C++, a data object called from an operating program is heap allocated 21. If the object has virtual functions, a linkage is established between the object's heap allocation 21 and a virtual function table 22, generally located in the class library containing the data for construction the object. The virtual table 22, containing pointers vf1 through vfn pointing to method execution data in the class library, provides a rapid means of traversing the hierarchical levels in the class library to locate the parameters of a method invoked through calling the object.

The linkage established between the object's heap allocation 21 and the virtual function table 22 is generally in the form of a "vtab" (virtual tab) pointer 23 stored in the object's heap allocation 21.

According to the invention described in the above mentioned application (application Ser. No. 08/239,192), the vtab pointer 23' can be stored in a private area of the object's heap allocation 21 and replaced with a new vtab pointer 24 pointing to a protocol function table 25, illustrated in FIG. 5.

The protocol function table 25 contains pointers pf1 through pfn pointing to method execution data in the class library for generic functions such as delaying method invocation and object destruction described in the concurrent application (application Ser. No. 08/239,192), and, in the context of the present application, a generic function or method for redirecting the thread of control to a remote processor.

In a C++ or similar computing environment, procedure calls between objects, whether remote or local, would be declared as virtual functions. The protocol function table interface could be linked, in a preferred embodiment, simply by overloading the "new" or allocate operation in the class library to return a pointer to the created object's descriptor, with the descriptor containing, in addition to the object's location, a pointer to a virtual function table.

In the case of the ROD, a vtab pointer 24 would point to the protocol function table 25 locating a generic method that would invoke a remote procedure call. In the case of LOD, the vtab pointer could point to a table of protocol functions 25 that would execute any called function locally, or point directly to the virtual function table.

Thus, in the C++ programming environment, provided that users use virtual functions and dynamic allocation of their objects with "new", they could treat descriptors as if they were regular C++ objects, with the protocol function interface mechanism translating calls to local or remote invocations as appropriate.

With this paradigm, users would never need to know when an object is remote and when it is not, that is, the system would be completely transparent to the user.

Also, utilizing the vtab pointer 24 in this way eliminates the need for non-standard operator overload of operations or language extensions in order to achieve remote procedure calling.

Similar to the virtual function table 22, the protocol function table 25 could be stored in the class library associated with the allocated object.

This invention has been described in relation to specific embodiments, but modifications obvious to those skilled in the art are intended to be covered by the appended claims.

We claim:

1. A composite mechanism for accessing remote data objects in a distributed memory environment having a plurality of parallel processors remote from each other, each processor having a local memory with parallel address locations, wherein for each data object having a storage location in the local memory of a first processor, the mechanism comprises:

a first variable storage repository at a first address location in the local memory of the first processor pointing to said object's storage location in the memory of the first processor; and a second variable storage repository at the first address location in the local memory of at least one remote parallel processor pointing to the first processor, whereby the first address location in the local memory of the first processor and the first address location in the local memory of the at least one remote parallel processor have a same corresponding address location.

2. A composite mechanism, according to claim 1, wherein the second variable storage repository is located in the local memory of every remote parallel processor in said environment.

3. A composite mechanism, according to claim 1, wherein the second variable storage repository is located in one remote parallel processor, and further comprising a third variable storage repository at the first address location in the local memory of remaining remote parallel processors pointing to said one remote parallel processor.

4. A composite mechanism, according to claim 1, further comprising relay means for changing variable storage repositories in response to data object migration, said relay means comprising:

means for creating and destroying first and second variable repositories; and means for replacing first and second variable repositories.

5. A composite mechanism, according to claim 4, wherein the relay means further comprise means for broadcasting changes in variable storage repositories to all remote parallel processors in the environment.

6. A composite mechanism, according to claim 4, further comprising means for transmitting changes in variable storage repositories to at least one remote parallel processor in the environment.

7. A composite mechanism, according to claim 1, further comprising an interface mechanism for redirecting local calls from a calling data object in the local memory of the first processor to a remote processor.

8. A composite mechanism, according to claim 7, wherein the interface comprises a protocol function table indexed to execution data for redirecting local calls to remote processors, and further comprising:

a virtual function table indexed to execution data for virtual functions;

means for constructing the calling data object as an object with virtual functions;

means for indexing the calling data object to the protocol function table; and means for indexing the protocol function table to the virtual function table.

9. A mechanism for accessing remote data objects in a distributed memory environment having a plurality of parallel processors remote from each other, each processor having a local memory with parallel address locations and each processor adapted to be a home processor storing data objects in said local memory, comprising:

for each home processor:

a first repository storage segment in the local memory of the home processor at an address location, said first repository storage segment being adapted to contain variables pointing to the data objects concurrently stored in the local memory of said home processor;

a second repository storage segment in the local memory of all remote parallel processors at the address location, said second repository storage segment being adapted to contain identifiers for the data objects concurrently stored in the local memory of said home processor, whereby the address location in the local memory of the home processor and the address location in the local memory of the remote parallel processors have a same corresponding location; and relay means for changing said first and second repository segments in response to a change in data object storage in said local memory of the home processor.

10. A mechanism, according to claim 9, wherein said second repository storage segments are adapted to contain variables pointing to the home processor.

11. A mechanism, according to claim 9, wherein said second repository storage segments are adapted to contain a value indicating the home processor.

12. The mechanism of claim 9 wherein the address location of the second repository storage segment indicates the home processor.

13. A method of accessing remote data objects in a distributed memory environment between remote parallel processors, each parallel processor having a local memory and being adapted to be a home processor storing at least one data object in said local memory, comprising the computer implemented steps of:

storing an address variable for a data object at a location in the local memory of the home processor;

storing an identifier variable for the data object at the location in the local memory of at least one remote parallel processor, whereby the location in the local memory of the home processor and the location in the local memory of the at least one remote parallel processor have a same corresponding location;

locating said identifier variable for accessing said address variable; and locating said address variable for accessing said data object in the local memory of the home processor.

14. A method, according to claim 13, further comprising the step of:

changing said address variable in response to migration of the data object in the local memory of the home processor.

15. A method, according to claim 13, further comprising the step of:

converting said address variable to an identifier variable at a location in local memory pointing to a remote parallel processor; and creating an address variable at the same location in the local memory of the remote parallel processor for an address in the local memory of said remote parallel processor, in response to migration of the data object outside the memory of the home processor to the address in the local memory of said remote processor.

16. A method, according to claim 15, further comprising the step of:

transmitting said identifier variable pointing to a remote parallel processor from the home processor to all remote parallel processors in the environment.

17. A method, according to claim 15, wherein the step of locating said identifier variable further comprises the step of transmitting said identifier variable to a remote parallel processor from the home processor.

18. A method, according to claim 13, further comprising the steps of:

constructing a calling data object in dynamic memory storage in the local memory of a remote processor;

creating a generic operation for redirecting a call from a data object to a remote processor; and linking the calling data object with the generic operation.

19. A method, according to claim 18, wherein the step of constructing the calling data object comprises the steps of:

declaring the calling data object as having virtual functions, and creating a first pointer in the calling data object indexing virtual functions in the calling data object to a virtual function table; and wherein the step of linking the calling data object with the generic operation comprises the steps of:

storing the first pointer in the calling data object as a variable, and replacing the first pointer with a second pointer indexing the virtual functions in the calling data object to a protocol function table indexed to the generic operation.

* * * * *